United States Patent Office 3,594,408
Patented July 20, 1971

3,594,408
RESORCINOL DIALKYL BENZOATES
John Frederick Hosler, Bound Brook, N.J., assignor to American Cyanamid Company, Stamford, Conn.
No Drawing. Original application Apr. 28, 1966, Ser. No. 545,851, now Patent No. 3,391,108, dated July 2, 1968. Divided and this application Feb. 1, 1968, Ser. No. 702,200
Int. Cl. C07c 69/78; C08b 45/58
U.S. Cl. 260—476R    4 Claims

ABSTRACT OF THE DISCLOSURE

As new chemical compounds, resorcinol di(alkylbenzoates) of the formula:

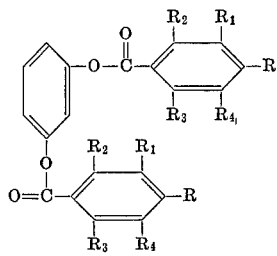

wherein each R is an alkyl radical of from four to twelve carbon atoms and each $R_1$, $R_2$, $R_3$ and $R_4$ is individually either hydrogen or alkyl of 1–4 carbon atoms. These compounds are useful as light stabilizers for polymers prepared from mono-olefins having from 2 to 4 carbon atoms.

---

This is a divisional application of application Ser. No. 545,851, filed Apr. 28, 1966, now U.S. Pat. 3,391,108, issued July 2, 1968.

This invention relates to resorcinol di(alkylbenzoates) of the Formula I:

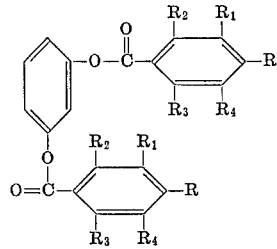

(I)

wherein R is an alkyl radical of from four to twelve carbon atoms and $R_1$, $R_2$, $R_3$ and $R_4$ individually are either hydrogen or alkyl of 1–4 carbon atoms.

A variety of materials has been proposed for stabilizing olefinic polymers against discoloration or damage by light. Some are highly effective, but these are also quite costly and, for the most part, they cannot be used as widely as would be desirable because many uses cannot tolerate high cost stabilizers. Some stabilizers are more economical, but for the most part, they are less effective than desired. Moreover, with new uses being developed for polyolefins, there is a constant demand for new stabilizers which are tailor-made for specific stabilization problems. Thus, there is a real need for a new class of more effective and less costly light stabilizers for polyolefins. It is the object of this invention to satisfy this need.

This and other objects have been accomplished by the present invention in a surprisingly simple manner. The present invention is based on the discovery of a new class of compounds as described in Formula I. Typical compounds of this class are resorcinol di(p-tert-butylbenzoate); resorcinol (di[p-(1,1,3,3-tetramethylbutyl)benzoate]; resorcinol di(2-methyl-4-tert-butyl)benzoate; resorcinol di(3-methyl-4-tert-butylbenzoate); resorcinol di[2-methyl-4-(1,1,3,3-tetramethylbutyl)benzoate]; resorcinol di[p-(2,2,4,4-tetramethylpentyl)-benzoate]; etc. These compounds are economical, though highly effective stabilizers for polymers of mono-olefins having 2–4 carbons, e.g., polyethylene, polypropylene and copolymers of ethylene and propylene. They are especially effective for polyolefins which are to be exposed to detergent solutions during use, since unlike other resorcinol derivatives they have excellent resistance to leaching out by detergent solutions.

The effectiveness of the compounds of Formula I is quite surprising. While resorcinol monobenzoate and dibenzoate are known to provide some light stability to polyolefins in which they are incorporated, they are not considered to have a high order of effectiveness, especially the monobenzoate of resorcinol. The herein claimed compounds are extremely effective as stabilizers compared with the known unsubstituted benzoates, in most cases providing about twice the stabilizing action of the dibenzoate, and about four times the stabilizing action of the monobenzoate. The action of the di(p-alkylbenzoate) of this invention is especially surprising and advantageous under conditions which call for resistance to leaching out by detergent solutions such as are encountered in home laundering and dishwashing operations. Under such conditions, previously known resorcinol monobenzoates and dibenzoates are easily leached out of the plastic substrate and leave the substrate as vulnerable to light degradation as a control sample which never contained stabilizer. The resorcinol di(p-alkylbenzoates) of this invention, surprisingly, are not leached out of the plastic substrate by detergent solutions, and are capable of providing light stability where previously known derivatives were ineffective.

The resorcinol di(alkylbenzoates) of Formula I are prepared by the reaction of one mole of resorcinol with two moles of alkylbenzoyl chloride according to the general reaction:

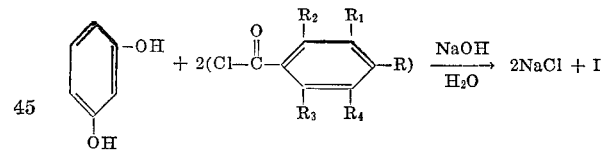

wherein the R's have the same significance as in Formula I above. The alkylbenzoyl chloride preferably is added slowly to a cooled solution of resorcinol in water containing sodium hydroxide while stirring the mixture. When addition is complete, reaction is allowed to proceed at room temperature for several hours. The liquid may then be decanted and the residue purified by recrystallization from alcohol. Many variations in the preparative procedure are possible while still yielding the desired compounds. Thus, organic solvents may be substituted for the water employed, but such solvents should not be reactive with the starting materials. Suitable solvents include benzene, toluene, hexane, dimethylformamide, acetone, etc. In place of sodium hydroxide there may be employed other alkali metal hydroxides, carbonates, bicarbonates and the like as well as organic acid-acceptors such as pyridine, amines, etc. The reaction temperature may vary up to and including reflux temperature, and the reaction may proceed at atmospheric pressure as well as super- and sub-atmospheric conditions. The reaction time will depend on the temperature employed to some extent, with shorter reaction times being employed at higher temperatures. The order of addition of the starting materials may be reversed if desired. It is preferred to maintain low temperatures during such addition.

Since the desired compounds are di-esters of resorcinol, for each mole of resorcinol employed, two moles of alkylbenzoyl chloride are required. While slight variations in the molar ratio are possible, no particular advantages result from such variations. The amount of acid acceptor employed should be equimolar to the amount of alkylbenzoyl chloride employed, although slight excesses may be used if desired.

Among the alkylbenzoyl chlorides that may be employed are included p-(tertiary-butyl)benzoyl chloride, p-(1,1,3,3-tetramethylbutyl)benzoyl chloride, 2 - methyl-4-tertiary butyl benzoyl chloride, 3-methyl-4-tertiary butyl benzoyl chloride, 2-methyl - 4 - (1,1,3,3-tetramethylbutyl)-benzoyl chloride, p-(2,2,4,4 - tetramethylpentyl)benzoyl chloride, etc.

The polymeric compositions stabilized by the resorcinol dialkylbenzoates of this invention may also contain thermal stabilizers. Various organic phosphites are used in this capacity. As an example of one which gives particularly good results is didecylphenyl phosphite. Others which may be used are lauryl thiodipropionate and stearyl thiodipropionate.

The useful concentration range of the resorcinol dialkylbenzoates of the present invention may vary from about 0.5 to 5.0%, preferably from 1.0 to 4.0%, based on the weight of the polymeric composition.

The stabilized polymeric compositions have a wide variety of uses; they may be used effectively for various types of molded articles, including appliance cabinets, kitchen cabinets, soft drink cases, milk cases, packing frames, building construction materials, window frames, panels, outdoor siding, etc.; they may also be used as extruded materials in the form of films or filaments, the filaments being of application for fabrication of fibers and fabrics for specialized uses as in fertilizer bags, ropes, container materials, marine material uses, etc. The process of the present invention extends the useful life of such articles beyond that which could be expected, especially where the polyolefin product is to encounter detergent solutions during use.

The invention is further illustrated by the examples which follow.

In the following examples, effectiveness of the compounds of the invention was determined by preparation of polymeric compositions containing them and exposing them to ultraviolet and other forms of light as exemplified by a Fluorescent Sunlamp-Blacklight Unit (FS–BL) and outdoors. The degree of degradation as shown by color formation is expressed as "Yellow Index." Yellow Index (YI) calculations were made from the visible spectra of the samples using the following equation:

$$YI = \frac{T_{680m\mu} - T_{420m\mu}}{T_{560m\mu} \text{ (initial)}} \times 100$$

where the T values are the percent transmissions at the various wavelengths indicated. The FS–BL results are reported as the number of hours to embrittlement of the polymer samples. The outdoor exposure samples are also characterized by physical appearance.

Since extractability of additives from polypropylene fibers is often an important criterion in their practical utility as stabilizers, thin polymer films (2–5 mils) containing the various additives were immersed in a boiling aqueous solution of detergent and bleach for 24 hours. The films were exposed to the FS–BL unit and the number of hours for embrittlement of the polymer samples was again determined.

EXAMPLE 1

Preparation of resorcinol di(p-tertiary butyl)benzoate

To a cooled solution of 27.5 parts (0.25 mole) of resorcinol and 20.0 parts (0.5 mole) of sodium hydroxide in 200 parts of water was added dropwise with stirring 98 parts (0.5 mole) of p-tertiary butyl benzoyl chloride. The temperature was kept below 15° C. during addition. After the addition was complete, the reaction mixture was allowed to stir at room temperature for 3 hours. The liquid was then decanted off and the remaining gum was stirred in water. The product was then recrystallized twice from ethanol. The product had a melting point of 90–91° C.

EXAMPLE 2

Following the procedure of Example 1 the appropriate resorcinol dialkylbenzoates may be prepared using the amounts of alkylbenzoyl chloride shown.

TABLE I

| Alkylbenzoyl chloride alkyl group: | Amount used (0.5 mole), parts |
|---|---|
| p-(2,2,3,3,-tetramethylbutyl) | 126.25 |
| 2-methyl-4-tertiary butyl | 105.25 |
| 3-methyl-4-tertiary butyl | 105.25 |
| 2-methyl-4-(2,2,3,3-tetramethylbutyl) | 133.25 |
| p-(2,2,4,4-tetramethylpentyl) | 133.25 |

EXAMPLE 3

The additives indicated in the following table (Table II) were incorporated at 2% based on the weight of the polymer into unstabilized polypropylene along with 0.4% based on the weight of the polymer of didecylphenyl phosphite as thermal stabilizer, by milling on a two-roll laboratory mill at 165–175° C. From the milled polymer samples, thin films (2.5–3.5 mils) and thick films (16–24 mils) were compression molded and exposed to the FS–BL Unit. The number of hours for embrittlement of the polymer samples was determined and is given in Table II.

TABLE II

| | FS-BL exposure brittle point (Hrs.) | |
|---|---|---|
| Additive | Thin film | Thick film |
| None | 112 | 243 |
| Resorcinol monobenzoate | 483 | 892 |
| Resorcinol dibenzoate | 755 | 1,200 |
| Resorcinol mono(p-tert-butyl benzoate) | 615 | 1,200 |
| Resorcinol di(p-tert-butyl benzoate) | 1,394 | 2,065 |

It can be seen that the di(alkyl-substituted benzoate ester provides nearly double the protection of the diester of unsubstituted benzoic acid.

EXAMPLE 4

The thick film samples described in Example 3 were exposed for three months in Arizona sunshine. Results are shown in Table III.

TABLE III

| Additive | Yellow Index | Remarks |
|---|---|---|
| None | | Brittle. |
| Resorcinol monobenzoate | 43 | Surface crazing. |
| Resorcinol dibenzoate | 8 | Do. |
| Resorcinol mono(p-tert-butylbenzoate) | 32 | Do. |
| Resorcinol di(p-tert-butylbenzoate) | 4 | Flexible. |

With the exception of the sample containing resorcinol di(p-tert-butylbenzoate), all samples including the untreated showed discoloration and surface crazing. Thus, under conditions of actual usage, only the compounds of the present invention were able to supply complete protection to the polymer.

EXAMPLE 5

The thin film samples described in Example 3 were exposed to a detergent-bleach solution as described above and then exposed in the FS–BL Unit as previously described. The number of hours to embrittlement following such laundering and exposure is given in Table IV.

TABLE IV

| Additive: | Brittle point (hrs.), FS-BL |
|---|---|
| None | 100 |
| Resorcinol monobenzoate | 100 |
| Resorcinol dibenzoate | 100 |
| Resrocinol mono(p-tert-butylbenzoate) | 100 |
| Resorcinol di(p-tert-butylbenzoate) | 472 |

These results show the outstanding durability of resorcinol di(p-alkylbenzoate) compared to the other additives. After laundering, the stabilizing effects imparted by the other additives was completely lost.

I claim:
1. As new chemical compounds, resorcinol di(alkylbenzoates) of the formula:

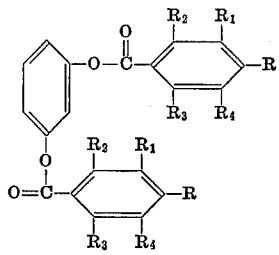

wherein each R is an alkyl radical of from four to twelve carbon atoms and each $R_1$, $R_2$, $R_3$ and $R_4$ is individually either hydrogen or alkyl of 1–4 carbon atoms.

2. The compounds of claim 1 wherein each R is t-butyl.
3. The compounds of claim 1 wherein $R_1$, $R_2$, $R_3$ and $R_4$ are each hydrogen.
4. The compound of claim 1 wherein each R is t-butyl and each of $R_1$, $R_2$, $R_3$ and $R_4$ is hydrogen.

References Cited

UNITED STATES PATENTS

| 2,704,749 | 3/1955 | Wood et al. | 260—45.85 |
| 2,157,068 | 5/1939 | Carruthers et al. | 260—45.85 |

LEWIS GOTTS, Primary Examiner

J. L. DAVISON, Assistant Examiner

U.S. Cl. X.R.

260—45.85